United States Patent
Watanabe et al.

(10) Patent No.: US 7,005,794 B2
(45) Date of Patent: Feb. 28, 2006

(54) IMPACT-RESISTANT FILM FOR FLAT DISPLAY PANEL, AND FLAT DISPLAY PANEL

(75) Inventors: Hiroshi Watanabe, Osaka (JP); Shigemi Kumamoto, Osaka (JP); Takeomi Miyako, Chiba (JP); Hiroshi Wachi, Chiba (JP); Ken Moriwaki, Chiba (JP)

(73) Assignees: Asahi Glass Company, Limited, Tokyo (JP); Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/924,777

(22) Filed: Aug. 25, 2004

(65) Prior Publication Data
US 2005/0077826 A1  Apr. 14, 2005

Related U.S. Application Data

(63) Continuation of application No. PCT/JP03/02042, filed on Feb. 25, 2003.

(30) Foreign Application Priority Data

Feb. 25, 2002 (JP) ............................. 2002-048154
Feb. 25, 2002 (JP) ............................. 2002-048156
Feb. 25, 2002 (JP) ............................. 2002-048157

(51) Int. Cl.
  *H01J 1/62*  (2006.01)
  *H01J 63/04*  (2006.01)

(52) U.S. Cl. ............... 313/489; 313/493; 313/582; 428/220

(58) Field of Classification Search ............... 313/484, 313/485, 489, 493, 582; 428/220, 317.7, 428/354, 213
See application file for complete search history.

(56) References Cited

U.S. PATENT DOCUMENTS 6,548,177 B1 * 4/2003 Hieda et al. ............. 428/441

FOREIGN PATENT DOCUMENTS

| JP | 11-119667 | 4/1999 |
|----|-----------|--------|
| JP | 11-119668 | 4/1999 |
| JP | 11-119669 | 4/1999 |
| JP | 2000-056694 | 2/2000 |
| JP | 2000-123751 | 4/2000 |
| JP | 2000-156182 | 6/2000 |
| JP | 2001-083886 | 3/2001 |
| JP | 2001-142406 | 5/2001 |
| JP | 2001-266759 | 9/2001 |
| JP | 2002-023649 | 1/2002 |

\* cited by examiner

*Primary Examiner*—Joseph Williams
*Assistant Examiner*—Kevin Quarterman
(74) *Attorney, Agent, or Firm*—Oblon, Spivak, McClelland, Maier & Neustadt, P.C.

(57) ABSTRACT

An impact-resistance film which is bondable to a front glass of a flat display panel main body that includes a first layer on the front glass side of the flat display panel that is made of a transparent synthetic resin having a shear modulus of from $1 \times 10^3$ Pa to $1 \times 10^6$ Pa. The film includes a second layer on the viewer's side of the first layer that is made of a transparent synthetic resin having a shear modulus of at least $1 \times 10^8$ Pa and includes a third layer on the viewer's side of the second layer that is made of a transparent synthetic resin having a shear modulus of at least $1 \times 10^6$ Pa and less than $1 \times 10^8$ Pa.

13 Claims, 2 Drawing Sheets

IMPACT-RESISTANT FILM FOR FLAT DISPLAY PANEL, AND FLAT DISPLAY PANEL

TECHNICAL FIELD

The present invention relates to an impact-resistant film for a flat display panel, which is to be attached to the front glass of a flat display panel to prevent breakage of the front glass by an impact and at the same time to make the weight reduction and thickness reduction possible, and a flat display panel employing such a film.

BACKGROUND ART

In recent years, attention has been drawn to a plasma display panel (hereinafter referred to simply as PDP) which has merits such that a large screen panel can be prepared and clear full color display is possible. PDP is to provide a full color display in such a manner that phosphors are selectively discharged to emit light in a large number of discharge cells isolatedly formed between two glass plates.

FIG. 1 is a view illustrating the structure of PDP. In this FIG., PDP shown by reference numeral 1 has a construction in which a front glass 2 and a rear glass 3 are disposed to face each other, and in the space between the two glasses 2 and 3, a rare gas such as xenon is sealed in a reduced pressure state. On the front glass 2, discharge electrodes 4, a dielectric film 5, a protecting film 6, etc. are formed, and on the rear glass 3, partition walls 7, phosphors 8A, 8B, 8C, address electrodes 9, etc. are provided.

The front glass 2 of PDP1 receives scratches or strains at the time of forming or laminating electrodes or thin films made of various materials, and the strength is remarkably deteriorated as compared with the original glass plate. Further, it is in contact with irregularities of the phosphors or the partition walls formed on the rear glass, and the stress is likely to be concentrated at such contact portions.

Heretofore, in order to prevent breakage of the front glass of a flat display panel for e.g. PDP, it has been common to provide a protecting plate made of an acrylic resin or reinforced glass, with a space of a few mm in front of the front glass, to prevent an impact from being exerted to the flat display panel. However, such a protecting structure has had a problem such that it hinders weight reduction or thickness reduction of the flat display panel. Further, there is a space between the protecting plate and the front glass of the panel, whereby there has been a problem such that outside light of e.g. a fluorescent lamp is likely to be reflected to deteriorate the image quality, or the screen image is likely to be distorted by slight vibration.

Various techniques have been proposed to prevent breakage of the front glass of a flat display panel. For example, Patent Document 1 proposes a technique to improve the strength by making the thickness of the front glass thick. However, with this structure, the protecting effect against impact is inadequate, and it increases the weight of the panel, such being problematic.

Further, a structure is proposed in which a protecting plate is bonded to the front glass of a panel via an adhesive layer (e.g. Patent Documents 2 to 5). However, with this structure, the impact is likely to be transmitted to the front glass, and there has been a problem that no adequate effect to prevent breakage of the front glass can be obtained.

As a still another prior art, an impact-reducing laminate (hereinafter referred to as a conventional laminate) is proposed wherein two layers made of transparent synthetic resins i.e. a crack-preventing layer (impact-reducing layer) B and a scatter-preventing layer A thereon, are laminated on the front glass of a flat display panel via a transparent adhesive layer, and the shear modulus of the scatter-preventing layer A is at least $2 \times 10^8$ Pa and the shear modulus of the crack-preventing layer B is within a range of from $1 \times 10^4$ to $2 \times 10^8$ Pa (Patent document 6).

References
  Patent Document 1: JP-A-2000-123751
  Patent Document 2: JP-A-2000-156182
  Patent Document 3: JP-A-11-119667
  Patent Document 4: JP-A-11-119668
  Patent Document 5: JP-A-11-119669
  Patent Document 6: JP-A-2001-266759

However, such a conventional laminate was inadequate in imparting impact resistance to the front glass of e.g. PDP. In Examples in the publication, a so-called "non treated" glass plate having no electrodes or no thin films made of various materials laminated, is used as the glass plate, and the adhesive layer, the impact-reducing layer and the scatter-preventing layer are laminated sequentially thereon, and presence or absence of impact resistance is tested by dropping a hardball thereon. However, as mentioned above, with a real front glass of PDP, as a result of lamination of electrodes or thin films made of various materials, the impact resistance is remarkably deteriorated as compared with non-treated glass and is susceptible to breakage. Therefore, with such a conventional laminate, it has not been proved that adequate impact resistance can be obtained when bonded to the front glass of PDP, of which the impact resistance is substantially deteriorated as compared with a non-treated glass plate.

As described in detail in Examples given hereinafter, in a case where three layers of the same materials and thicknesses as disclosed in Examples of the publication, were laminated on a glass substrate assumed to be the front glass of PDP by forming electrodes and a dielectric film on a glass plate, and the impact resistance was measured by exerting a prescribed impact force by a spring impact, it was found that such a laminate was inadequate in the impact resistance (see Example 23 given hereinafter).

Thus, the conventional laminate was inadequate as an impact resistant film to protect the front glass of a flat display panel such as PDP, having the impact resistance deteriorated.

DISCLOSURE OF THE INVENTION

It is an object of the present invention to provide an impact-resistant film for a flat display panel (hereinafter referred to simply as an impact-resistant film) which can be attached to the front surface of the flat display panel to prevent breakage and scattering of glass of the panel upon receipt of an impact and whereby weight reduction and thickness reduction are possible, and to provide a flat display panel employing such a impact-resistant film.

To accomplish the above object, in a first aspect, the present invention provides an impact-resistant film for a flat display panel, which is an impact-resistant film to be bonded to a front glass of a flat display panel main body and which comprises a first layer on the front glass side of the flat display panel main body, made of a transparent synthetic resin having a shear modulus of from $1 \times 10^3$ Pa to $1 \times 10^6$ Pa, and having a thickness within a range of from 1 to 4 mm, and a second layer on the viewer's side of the first layer, made of a transparent synthetic resin having a shear modulus of at least $1\times10^8$ Pa, and having a thickness within a range of from 0.05 to 3 mm.

The impact-resistant film in the first aspect of the present invention is one having the first layer made of a soft transparent synthetic resin having a shear modulus of from $1\times10^3$ Pa to $1\times10^6$ Pa and having a thickness within a range of from 1 to 4 mm, provided between the front glass of a flat display panel and the second layer made of a hard transparent synthetic resin having a shear modulus of at least $1\times10^8$ Pa and having a thickness within a range of from 0.05 to 3 mm, and upon receipt of an impact, the impact force will be dispersed and absorbed by the second layer and further the impact will be absorbed by the soft first layer provided between the second layer and the front glass, whereby transmission of the impact force to the front glass can be prevented. Thus, it is possible to provide an impact-resistant film which is light in weight, thin and excellent in impact resistance.

The impact-resistant film in the first aspect of the invention preferably has a structure in which the second layer is laminated on the viewer's side surface of the first layer.

Further, the above first layer is preferably made of a resin material having an adhesive property, to be bonded directly on the front glass of the above flat display panel. Further, it may have a structure wherein at least one layer selected from the group consisting of an electromagnetic wave shielding layer, a near infrared absorption layer and an antireflection layer, and an adhesive layer bonding such layers, are laminated on the viewer's side of the second layer.

Further, in a second aspect, the present invention provides an impact-resistant film for a flat display panel, which is an impact-resistant film to be bonded to a front glass of a flat display panel main body and which comprises a first layer on the front glass side of the flat display panel, made of a transparent synthetic resin having a shear modulus of from $1\times10^3$ Pa to $1\times10^6$ Pa, a second layer on the viewer's side of the first layer, made of a transparent synthetic resin having a shear modulus of at least $1\times10^8$ Pa, and a third layer on the viewer's side of the second layer, made of a transparent synthetic resin having a shear modulus of at least $1\times10^6$ Pa and less than $1\times10^8$ Pa.

The impact-resistant film in the second aspect of the present invention has a construction wherein the first layer made of a soft synthetic resin having a shear modulus of from $1\times10^3$ Pa to $1\times10^6$ Pa is provided between the front glass of the flat display panel and the second layer made of a hard synthetic resin having a shear modulus of at least $1\times10^8$ Pa, and the third layer having a shear modulus of at least $1\times10^6$ Pa and less than $1\times10^8$ Pa is laminated on the viewer's side of the second layer, and upon receipt of an impact, the impact force will be dispersed and absorbed by the third layer, and further, the impact will be absorbed by the soft first layer provided between the front glass and the second layer, whereby transmission of the impact force to the front glass can be prevented. Thus, it is possible to provide an impact-resistant film which is light in weight, thin and excellent in impact resistance.

In the impact-resistant film in the second aspect of the present invention, it is preferred that the thickness of the first layer is within a range of from 1 to 4 mm, the thickness of the second layer is within a range of from 0.05 to 3 mm, and the thickness of the third layer is within a range of from 0.05 to 2 mm.

Further, it is preferred to have a structure in which the second layer is laminated on the viewer's side of the first layer.

Further, the first layer is preferably made of a resin material having an adhesive property, to be directly bonded on the front glass of the flat display panel.

Further, it may have a structure wherein at least one layer selected from the group consisting of an electromagnetic wave shielding layer, a near infrared absorption layer and an antireflection layer, and an adhesive layer bonding such layers, are laminated on the viewer's side of the second layer.

Further, in a third aspect, the present invention provides a flat display panel having the impact-resistant film in the first or second aspect of the present invention bonded on the front glass of the flat display panel main body directly or via a transparent adhesive layer.

Figure 1:
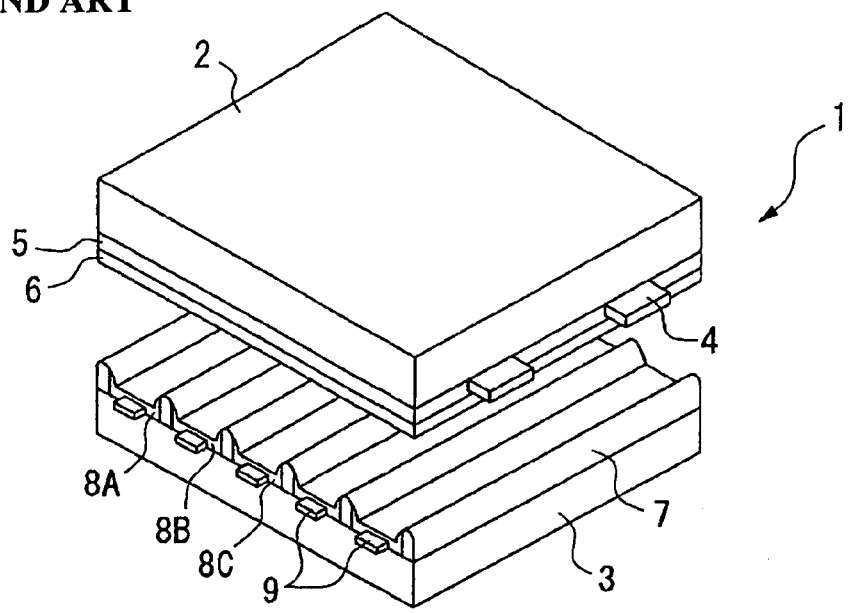
FIG. 1 is a perspective view of the main portion to illustrate the construction of PDP.

DESCRIPTION OF SYMBOLS 10, 30, 50: Impact-resistant film (impact-resistant film for a flat display panel)
11, 21: Flat display panel main body
12, 22: Front glass
13, 23: First layer
14, 24: Second layer
25: Third layer
15: Adhesive layer
16: Electromagnetic wave-shielding layer
17: Near infrared absorption layer
18: Anti-reflection layer
20, 40, 60: Flat display panel

MODE FOR CARRYING OUT THE INVENTION

First Aspect of the Present Invention

Figure 2:
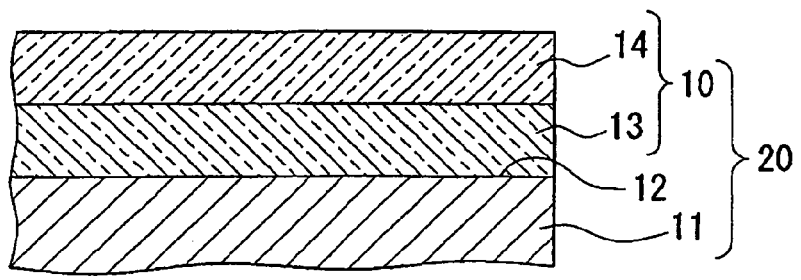
FIG. 2 is a cross-sectional view showing one embodiment of the impact-resistant film and the flat display panel according to the first aspect of the present invention.

FIG. 2 is a view showing one embodiment of the impact-resistant film according to the first aspect of the present invention. This impact-resistant film 10 comprises a first layer 13 made of a transparent synthetic resin having a shear modulus G' in the measurement of dynamic viscoelasticity (hereinafter referred to simply as a shear modulus) of from $1\times10^3$ Pa to $1\times10^6$ Pa and having a thickness within a range of from 1 mm to 4 mm, as provided on the front glass 12 side of a flat display panel main body 11, and a second layer 14 made of a transparent synthetic resin having a shear modulus of at least $1\times10^8$ Pa and having a thickness within a range of from 0.05 to 3 mm, as laminated on the viewer's side of the first layer 13.

The above-mentioned shear modulus (G') is a value of the shear modulus G' measured at 25° C.±3° C. at a frequency of 1 Hz. Further, generally, there is a relation such that the tensile modulus E=3G' (shear modulus), and thus, the tensile modulus E is about 3 times the above-mentioned shear modulus.

First Layer 13

The first layer 13 to be provided on the front glass 12 side of the flat display panel main body 11, is made of a transparent synthetic resin having a shear modulus of from $1\times10^3$ Pa to $1\times10^6$ Pa. As such a synthetic resin, a urethane resin, an acrylic resin, a silicone resin, a phenol resin, a urea resin, an epoxy resin, a fluorine resin, a vinyl resin, a butadiene resin, a neoprene resin, a styrene resin or an acrylonitrile resin, may, for example, be optionally selected for use alone or in the form of a blend or copolymer of two or more different resins. Among them, an urethane resin and a silicone resin as thermosetting resins, are most preferred, taking into consideration the balance of the impact resistance, the property to prevent scattering of broken glass, the transparency, the self-restoring property, the heat resistance, the durability, etc. By using such a thermosetting resin, even when the impact-resistant film 10 is applied to PDP whereby the front glass 12 is exposed to a relatively high temperature, the excellent impact-resistance can be maintained for a long period of time without such a trouble that the first layer 13 in contact with the front glass 12, will melt and flow.

The shear modulus of this first layer 13 is within a range of from $1\times10^3$ Pa to $1\times10^6$ Pa, preferably from $2\times10^4$ Pa to $6\times10^5$ Pa. By adjusting the shear modulus within the above range, it is possible to efficiently disperse, and absorb and reduce the impact force transmitted from the second layer 14 side towards the front glass 12, thereby to prevent breakage of the front glass 12 of the flat display panel main body 11, and lamination on the front glass 12 will be easy, and processability during the formation of the layer will be improved. Further, among thermosetting resins having the shear modulus within the above range, one having an adhesive property, for example, a silicone film manufactured by GELTEC Co., Ltd., such as a resin material known by the tradename αGEL, θ-5, θ-6, θ-7 or θ-8, can easily be laminated on the front glass 12 by placing such a material on the front glass 12, placing a second layer 14 thereon, followed by pressing treatment by means of e.g. a rubber roll, whereby the production process will be substantially simplified, such being preferred. In a case where the adhesive property of the first layer 13 is not adequate, the transparent adhesive layer may be provided on each side of the first layer 13, whereupon the front glass 12 and the second layer 14 may be bonded.

The thickness of the first layer 1 is from 1 to 4 mm, preferably from 1.5 to 3 mm. When the first layer 13 is at least 1 mm, the above impact force can be efficiently dispersed and reduced, and when it is at most 4 mm, the processability will be excellent, and such will be economically advantageous.

The first layer 13 may further contain an additive such as a leveling agent, a defoaming agent, a color-adjusting colorant, a near infrared absorbing (reflecting) colorant, an antistatic agent, a heat stabilizer, an antioxidant, a dispersing agent, a flame retardant, a lubricant, a plasticizer or an ultraviolet absorber. Further, between the first layer 13 and the second layer 14, another layer containing a color-adjusting colorant, a near infrared absorbing (reflecting) colorant, an antistatic agent, an ultraviolet absorber or the like, may be interposed.

In a case where a thermosetting resin such as a urethane resin or a silicone resin is used as the material for the above first layer 13, the first layer 13 having a proper thickness may be formed by means of a coating method such as a dip coating method, a spray coating method, a spinner coating method, a bead coating method, a wire bar coating method, a blade coating method, a roll coating method, a curtain coating method, a slit die coater method, a gravure coater method, a slit reverse coater method, a microgravure coater method or a comma coater method, an extrusion molding method, a calender roll molding method, or a batch molding method. In order to improve the processability, the above thermosetting resin may be diluted with an organic solvent such as toluene, MEK, ethyl acetate, methylene chloride or an alcohol, and then coated. For the first layer 13, a film obtainable by coating the above thermosetting resin on a suitable substrate, may be used. Otherwise, it may be directly coated on the viewer's side surface of the front glass 12 or on the front glass 12 side surface of the second layer 14.

Second Layer 14

The second layer 14 is made of a transparent synthetic resin having a shear modulus of at least $1\times10^8$ Pa and a thickness within a range of from 0.05 to 3 mm. In this embodiment, it is directly laminated on the viewer's side surface of the first layer 13. Such a second layer 14 may, for example, be made of a polyester resin such as polyethylene terephthalate, polyethylene naphthalate or polybutylene terephthalate, a cellulose ester resin such as diacetyl cellulose, triacetyl cellulose, propionyl cellulose, butyryl cellulose or nitrocellulose, a polyamide resin, a polycarbonate resin, a polyallylate resin, a polystyrene resin, an ethylene/vinyl acetate copolymer resin, a polyolefin resin such as polypropylene or polymethylpentene, an acrylic resin, a polyether ketone resin, a polyurethane resin, or a polyetherimide resin. Particularly preferred are a polyester resin and a polycarbonate resin, which are excellent in impact resistance.

The thickness of the second layer 14 is from 0.05 to 3.0 mm, preferably from 0.1 to 2.0 mm. By adjusting the thickness of the second layer 14 within the above range, not only the impact resistance can be improved, but also the operation efficiency in bonding will be improved. Further, by adjusting the shear modulus of the second layer 14 to be at least $1\times10^8$ Pa, preferably within a range of from $2\times10^8$ Pa to $1\times10^{10}$ Pa, not only it is possible to obtain an impact-resistant film having adequate impact resistance in a state laminated with the first layer 13, but also lamination with the front glass 12 will be facilitated, and the processability during the forming of the layer itself will be improved. In a case where the first layer 13 is formed on one side of the second layer 14 as a substrate, it is preferred to apply corona treatment or bonding-facilitating treatment on the surface of the second layer 14. This second layer 14 may contain an additive such as a leveling agent, a defoaming agent, a color-adjusting colorant, a near infrared absorbing (reflecting) colorant, an antistatic agent, a heat stabilizer, an antioxidant, a dispersing agent, a flame retardant, a lubricant, a plasticizer or an ultraviolet absorber.

The impact-resistant film 10 of this embodiment comprises a first layer 13 provided on the front glass 12 side of a flat display panel main body 11, which is made of a transparent synthetic resin having a shear modulus of from $1\times10^3$ Pa to $1\times10^6$ Pa and which has a thickness within a range of from 1 to 4.0 mm, and a second layer 14 laminated on the viewer's side of the first layer 13, which is made of a transparent synthetic resin having a shear modulus of at least $1\times10^8$ Pa and a thickness of from 0.05 to 3 mm, and has a structure such that the soft first layer 13 is interposed between the front glass 12 and the second layer 14 made of a hard resin, in such a state that the first layer 13 is bonded to the front glass 12 of the flat display panel main body 11. Accordingly, any impact transmitted from the second layer 14 to the front glass 12 side via the first layer 13 can be dispersed, and absorbed and reduced by the first layer 13, and it is thus possible to provide an impact-resistant film 10 which is capable of preventing transmission of the impact force to the front glass 12 and which is light in weight, thin and excellent in the impact resistance.

Second Aspect of the Present Invention

Figure 3:
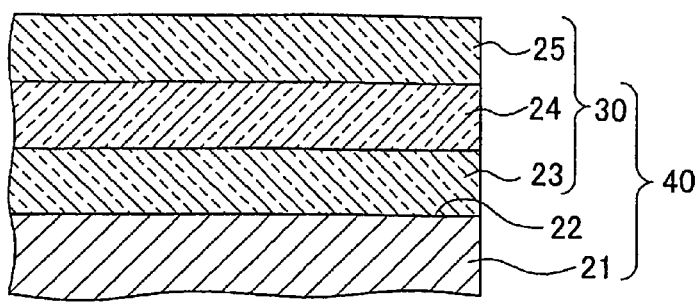
FIG. 3 is a cross-sectional view showing one embodiment of the impact-resistant film and the flat display panel according to the second aspect of the present invention.

Now, FIG. 3 shows an embodiment of the impact-resistant film according to the second aspect of the present invention. This impact-resistant film 30 comprises a first layer 23 provided on the front glass 22 side of a flat display panel main body 21, made of a transparent synthetic resin having a shear modulus G' in the measurement of dynamic viscoelasticity (hereinafter referred to simply as a shearing modulus) of from $1\times10^3$ Pa to $1\times10^6$ Pa, a second layer 24 provided on the viewer's side surface of the first layer 23, made of a transparent synthetic resin having a shear modulus of at least $1\times10^8$ Pa, and a third layer 25 laminated on the viewer's side surface of the second layer 24, made of a transparent synthetic resin having a shear modulus of at least $1\times10^6$ Pa and less than $1\times10^8$ Pa.

First Layer 23

For the first layer 23, the same synthetic resin as used for the first layer 13 described in the first aspect of the present invention, may be used. However, the thickness of the first layer 23 is preferably from 1 to 4 mm, more preferably from 1.5 to 3 mm. When the first layer 13 is at least 1 mm, the above-mentioned impact force can efficiently be dispersed and reduced, and when it is at most 4 mm, the processability will be excellent, and such will be economically advantageous. Further, the first layer 23 may contain various additives in the same manner as in first layer 13. Between the first layer 23 and the second layer 24, various other layers may be interposed in the same manner as between the first layer 13 and the second layer 14.

In a case where a thermosetting resin such as a urethane resin or a silicone resin is used as the material for the first layer 23, it may be formed by the same method as for the first layer 13.

Second Layer 24

For the second layer 24, the same synthetic resin as used for the second layer 14 described in the first aspect of the present invention, may be used. However, the thickness of the second layer 24 is preferably from 0.05 to 3 mm, more preferably from 0.1 to 2 mm. Further, in the same manner as for the second layer 14, corona treatment or bonding-facilitating treatment may be applied to its surface, or it may contain various additives.

Third Layer 25

The third layer 25 is made of a transparent synthetic resin having a shear modulus of at least $1\times10^6$ Pa and less than $1\times10^8$ Pa. This third layer 25 may, for example, be made of a polyurethane resin, a polyester resin such as polyethylene terephthalate, polyethylene naphthalate or polybutylene terephthalate, a cellulose ester resin such as diacetyl cellulose, triacetyl cellulose, propionyl cellulose, butyryl cellulose or nitrocellulose, a polyamide resin, a polycarbonate resin, a polyarylate resin, a polystyrene resin, an ethylene/vinyl acetate copolymer resin, a polyolefin resin such as polypropylene or polymethylpentene, an acrylic resin, a polyether ketone resin or a polyetherimide resin. Particularly preferred is a polyurethane resin which is excellent in the impact resistance.

The thickness of the third layer 25 is preferably from 0.05 to 2 mm, more preferably from about 0.1 to 0.5 mm. By adjusting the thickness of the third layer 25 to be within the above range, not only it is possible to improve the impact resistance, but also the operation efficiency during the bonding will be improved. Further, by adjusting the shear modulus of this third layer 25 to at least $1\times10^6$ Pa and less than $1\times10^8$ Pa, preferably from $2\times10^4$ Pa to $6\times10^5$ Pa, it is possible to disperse and absorb the impact in this third layer 25, and it is possible to construct an impact-resistant film having sufficient impact resistance in a state where it is laminated with the first layer 23 and the second layer 24.

As a preferred example of this embodiment, a structure may be mentioned wherein the third layer 25 is a laminated film obtained by laminating a synthetic resin film having a low refractive index on one side of a synthetic resin film having a shear modulus within a range of at least $1\times10^6$ Pa and less than $1\times10^8$ Pa to provide an anti-reflection function in addition to the impact absorbing function inherent to the third layer 25. Particularly preferred is an anti-reflection layer having a low refractive index layer made of a non-crystalline fluorinated polymer on one side of a polyurethane soft resin, and specifically, ARCTOP (tradename) manufactured by Asahi Glass Company, Limited, may, for example, be mentioned. Further, this polyurethane soft resin may contain e.g. a leveling agent, a defoaming agent, a color-adjusting colorant, a near infrared absorbing (reflecting) colorant, an antistatic agent, a heat stabilizer, an antioxidant, a dispersing agent, a flame retardant, a lubricant, a plasticizer or an ultraviolet absorber.

The impact resistant film 30 of this embodiment comprises, as laminated, the first layer 23 made of a transparent synthetic resin having a shear modulus of from $1\times10^3$ Pa to $1\times10^6$ Pa, the second layer 24 made of a transparent synthetic resin having a shear modulus of at least $1\times10^8$ Pa, and the third layer 25 made of a transparent synthetic resin having a shear modulus of at least $1\times10^6$ Pa and less than $1\times10^8$ Pa. Accordingly, upon receipt of an impact, the impact force will be dispersed and absorbed by the third layer 25, and further, the impact will be absorbed by the soft first layer 23 provided between the second layer 24 and the front glass 22, whereby transmission of the impact force to the front glass 22 will be prevented, and it is possible to provide an impact-resistant film which is light in weight, thin and excellent in the impact resistance.

Figure 4:
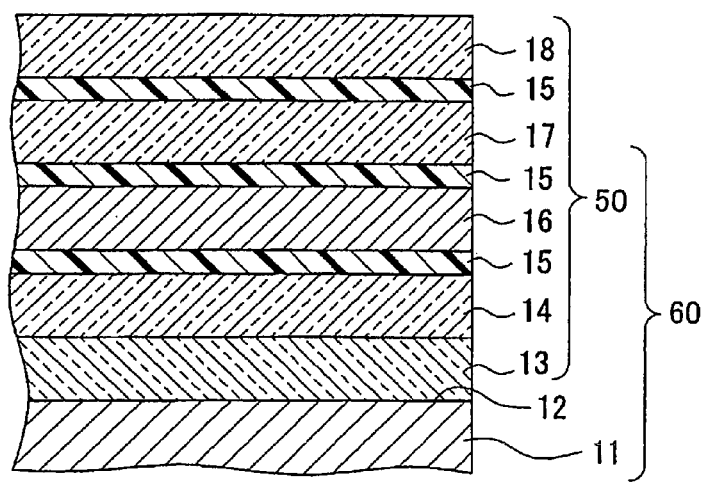
FIG. 4 is a cross-sectional view showing another embodiment of the impact-resistant film and the flat display panel according to the first aspect of the present invention.

FIG. 4 is a view showing another embodiment of the impact-resistant film according to the first aspect of the present invention.

The impact-resistant film of the present invention may be constructed by laminating one or more layers having various functions on the viewer's side of the above-mentioned second layer 14. As such layers, a ultraviolet absorbing layer, a color-adjusting layer, a near infrared absorbing (reflecting) layer, an antifouling layer, a reflection-preventing layer, an electromagnetic wave-shielding layer, a hard coat layer and a layer to impart a scratch resistance function, may, for example, be mentioned. Also in the second aspect of the present invention, one or more layers having various functions may be laminated on the viewer's side of the third layer 25. Likewise, in the third aspect of the present invention, one or more layers having various functions may be laminated on the viewer's side of the second layer 44.

Now, with reference to FIG. 4 showing the first aspect of the present invention, one example will be described in detail. The impact-resistant film 30 shown in FIG. 4 has a structure wherein on the viewer's side of the second layer 14, an electromagnetic wave-shielding layer 16, a near infrared absorbing layer 17 having both a near infrared absorbing function and a color-adjusting function, and an anti-reflection layer 18, are laminated sequentially via an adhesive layer 15. This example shows a preferred combination in a case where the flat display panel main body 11 is PDP. In an application to a flat display panel other than PDP or in a case where a electromagnetic wave-shielding function, a near infrared absorbing function and/or a color-adjusting function is already imparted to either the first layer 13 or the second layer 14, one or both of the electromagnetic wave-shielding layer 16 and the near infrared absorbing layer 17 may be omitted.

Details of the respective layers in this embodiment will be described below.

Electromagnetic Wave-Shielding Layer

The electromagnetic wave-shielding layer 16 is one to shield electromagnetic waves emitted from the front glass 12 of PDP thereby to prevent an influence of electromagnetic noises to other household electric appliances and equipment, etc. As the electromagnetic wave-shielding layer 16 for PDP, an electroconductive layer made of an electroconductive metal mesh, or a light transmitting electroconductive layer made of a metal film of from 5 to 20 nm formed by means of a thin film-forming technique such as sputtering or an electroconductive multilayer film having such a metal film and an oxide laminated in a multilayer structure, can be employed. For the electroconductive layer made of an electroconductive metal mesh, various mesh materials which have been well known as electromagnetic wave-shielding meshes for PDP, can be employed. Such mesh materials are also disclosed, for example, in JP-A-11-212475, the above-mentioned Patent Document 2 and JP-A-2000-286593.

As the metal layer to be used for the light transmitting electroconductive layer, preferred is a layer made of at least one metal selected from the group consisting of Au, Ag and Cu or a layer containing such a metal as the main component. It is particularly preferred to use a metal layer containing Ag as the main component, since the resistivity is small, and the absorption is small. Further, as the metal layer containing Ag as the main component, a metal layer containing Ag as the main component and further containing at least one of Pd, Au and Cu, is preferred, since diffusion of Ag is suppressed, and consequently, the moisture resistance will be improved. The proportion of the content of at least one of Pd, Au and Cu is preferably from 0.3 to 10 atomic %, based on the total content of Ag and at least one of Pd, Au and Cu. When it is at least 0.3 atomic %, the effect to stabilize Ag can be obtained, and at the same time when it is at most 10 atomic %, it is possible to secure a good film-forming rate and visible light transmittance, while maintaining good moisture resistance. From such a viewpoint, the proportion is more preferably at most 5.0 atomic %.

Further, the cost of the target remarkably increases as the proportion increases, and taking into usually required moisture resistance into consideration, the proportion is particularly preferably within a range of from 0.5 to 2.0 atomic %. In a case where such a light transmitting conductive layer is to be formed in a single layer, the thickness of such a metal layer is usually from 5 to 20 nm, preferably from 5 to 15 nm. The method for forming such a metal layer is not particularly limited, but it is preferred to form a thin metal film uniformly directly on one side of a transparent substrate by means of a sputtering method for film forming.

As such an electroconductive layer, it is preferred to employ a multilayer electroconductive film having an oxide layer and a metal layer laminated alternately on a suitable transparent substrate such as a transparent synthetic resin film, particularly a multilayer electroconductive film having them laminated alternately in the order of an oxide layer, a metal layer, an oxide layer . . . in a total of (2n+1) layers (wherein n is an integer of at least 1), whereby a low sheet resistance, a low reflectance and a high visible light transmittance can be obtained. The oxide layer may be a layer containing, as the main component, an oxide of at least one metal selected from the group consisting of Bi, Zr, Al, Ti, Sn, In and Zn. Preferably, it is a layer containing, as the main component, an oxide of at least one metal selected from the group consisting of Ti, Sn, In and Zn. Particularly preferred is a layer containing ZnO as the main component, whereby the absorption is small, and the refractive index is about 2, or a layer containing $TiO_2$ as the main component, whereby a preferred color tone can be obtained in a small number of layers.

The oxide layer may be composed of a plurality of thin oxide layers. For example, instead of an oxide layer containing ZnO as the main component, it may be composed of a layer containing $SnO_2$ as the main component and a layer containing ZnO as the main component. The oxide layer containing ZnO as the main component is preferably an oxide layer comprising ZnO, which contains at least one metal other than Zn. Such an at least one metal contained, is present mainly in the state of an oxide in the oxide layer. ZnO containing at least one metal is preferably ZnO containing at least one metal selected from the group consisting of Sn, Al, Cr, Ti, Si, B, Mg and Ga. The proportion of the content of such an at least one metal is preferably from 1 to 10 atomic %, based on the total amount of Zn and the total of such metals, whereby the moisture resistance of the resulting electroconductive film will be improved. When it is at least 1 atomic %, it is possible to sufficiently reduce the internal stress of the ZnO film thereby to obtain good moisture resistance. Further, when it is at most 10 atomic %, the crystallinity of ZnO can be maintained well, and at the same time, the compatibility with the metal layer will not deteriorate. In order to obtain a ZnO film having a low internal stress constantly with good reproducibility and taking the crystallinity of ZnO into consideration, the proportion of the content of such a metal is preferably from 2 to 6 atomic %.

The geometrical thicknesses (hereinafter referred to simply as the thicknesses) of the oxide layers are preferably such that the thickness of an oxide layer closest to the substrate and an oxide layer remotest from the transparent substrate is from 20 to 60 nm (especially from 30 to 50 nm), and the thickness of other oxide layers is from 40 to 120 nm (especially from 40 to 100 nm). The total thickness of the metal layers is preferably from 25 to 40 nm (especially from 25 to 35 nm) when the desired resistance of the resulting electroconductive layer is 2.5 $\Omega/\square$ or from 35 to 50 nm (especially from 35 to 45 nm) when the desired resistance is 1.5 $\Omega/\square$. The entire total thickness of the oxide layers and the metal layers is preferably from 150 to 220 nm (especially from 160 to 200 nm) when the number of metal layers is 2, from 230 to 330 nm (especially from 250 to 300 nm) when the number of metal layers is 3, or from 270 to 370 nm (especially from 310 to 350 nm) when the number of metal layers is 4.

Another layer (hereinafter referred to as an oxidation barrier layer) to prevent oxidation of metal layers may be provided between the first metal layer and the second oxide layer, between the second metal layer and the third oxide layer, or between the third metal layer and the fourth oxide layer, at the time of forming oxide layers. As such an oxide barrier layer, a metal layer, an oxide layer or a nitride layer may, for example, be used. Specifically, it may be at least one metal selected from the group consisting of Al, Ti, Si, Ga and Zn, or an oxide or nitride of such a metal. Preferably, ZnO containing Ti or Si, and Ga, is used. The thickness of the oxidation barrier layer is preferably from 1 to 7 nm. If it is thinner than 1 nm, it shows no adequate action as a barrier layer. If it is thicker than 7 nm, the transmittance of the film system tends to deteriorate.

To this electromagnetic wave-shielding layer 16, an electrode for connection to a ground lead (not shown) is connected which leads an electric current generated in that layer caused by electromagnetic waves emitted from the PDP main body, to the ground lead. The shape or size of this electrode is not particularly limited, but the lower the resistance, the better from the viewpoint of the electromagnetic wave-shielding performance. This electrode is preferably provided along the entire periphery of the impact-resistant film 30, with a view to securing the electromagnetic wave-shielding effect of the light transmitting electroconductive film. As such an electrode, an electrode obtainable by coating e.g. an Ag paste (a paste comprising Ag and glass frit) or a Cu paste (a paste comprising Cu and glass frit), followed by baking, can be suitably employed. Further, it may have a construction which includes a long ground lead (not shown) connected to this electrode.

Near Infrared Absorbing Layer

The near infrared absorbing layer 17 is made of a transparent synthetic resin layer containing a colorant having a near infrared absorbing ability to absorb near infrared rays emitted from the PDP main body and a colorant having a color-adjusting ability. These colorants may be dyes or pigments. Here, "a colorant having a near infrared absorbing ability (hereinafter referred to as a near infrared absorbing agent)" may be a colorant capable of absorbing at least a part of light in a near infrared region (wavelength: 780 to 1,300 nm), and such a colorant may be a colorant having an adsorbing ability for other wavelength region such as visible light. Further, "a colorant having a color-adjusting ability (hereinafter referred to as a color-adjusting agent)" is a colorant capable of specifically absorbing light in a visible light wavelength region (wavelength: 380 to 780 nm), preferably light in a specific wavelength region (or a plurality of regions). The base synthetic resin to which the near infrared absorbing agent and the color-adjusting agent are to be incorporated, is not particularly limited, and various transparent thermoplastic synthetic resins or thermosetting synthetic resins may be employed. Further, the thickness of the layer is not particularly limited, but it is preferably from about 0.5 to 25 μm.

The near infrared absorbing agent may, for example, be a polymethine type, phthalocyanine type, naphthalocyanine type, metal complex type, aminium type, immonium type, diimmonium type, anthraquinone type, dithiol metal complex type, naphthoquinone type, indolphenol type, azo type or triallylmethane type compound, but is not limited thereto. For the purpose of absorbing heat radiation or preventing noises of an electronic equipment, a near infrared absorbing agent having a maximum absorption wavelength of from 750 to 1,100 nm is preferred, and a metal complex type, aminium type, phthalocyanine type, naphthalocyanine type or diimmonium type compound, is particularly preferred. The near infrared absorbing agents may be used alone or as a mixture of two or more of them.

The color-adjusting agent is employed to absorb a part a specific wavelength region of visible light thereby to improve the color of transmitting visible light. The color-adjusting agent which can be used in the present invention, may be a well known organic pigment or organic dye of e.g. an azo type, condensed azo type, diimmonium type, phthalocyanine type, anthraquinone type, indigo type, perinone type, perylene type, dioxazine type, quinacridone type, methine type, isoindolinone type, quinophthalone type, pyrrole type, thoindigo type or metal complex type, or an inorganic pigment. However, it is preferred to use one or more among colorants which are excellent in weather resistance and also excellent in the compatibility or dispersibility with the main agent of the near infrared absorbing layer 17, such as diimmonium type, phthalocyanine type and anthraquinone type colorants in a proper combination.

In a case where this impact-resistant film 50 is applied to PDP, by this near infrared absorbing agent, near infrared rays emitted from the display screen of PDP will be absorbed by the near infrared absorbing layer 17, whereby formation of noises to an electronic equipment can be prevented. Further, as the color-adjusting agent to be incorporated in the near infrared absorbing layer 17, it is preferred to incorporate one or more color-adjusting agents in combination to selectively absorb and attenuate extra-emitted colors (mainly in a wavelength region of from 560 to 610 nm) from a discharge gas such as a two component gas of neon and xenon, sealed in the PDP main body. By such colorant construction, among visible lights emitted from the display screen of PDP, extra lights attributable to luminescence of the discharge gas, will be absorbed and attenuated, and as a result, the display color of visible lights emitted from the display screen of PDP can be made closer to the intended display color, and it is possible to provide PDP which is capable of displaying natural colors. Among colorants which selectively absorb and attenuate extra-emitted colors from the above-mentioned discharge gas, as described above, there are some which have a function to absorb and attenuate near infrared rays.

Antireflection Layer

The antireflection layer 18 may be any layer having an antireflection property, and any known antireflection method may be employed. For example, it may be a layer subjected to an antiglare treatment or a layer having a low refractive index layer. With a view to preventing scattering of broken fragments when the highly rigid transparent substrate itself is broken by an accident, it is preferably one having a low refractive index layer on one side of a resin film. Particularly preferred is an antireflection layer having a low refractive index layer made of a non-crystalline fluoropolymer on one side of a polyurethane type flexible resin layer, and specifically, ARCTOP (tradename) manufactured by Asahi Glass Company, Limited, may, for example, be mentioned. Further, in order to impart abrasion resistance, a lubricant may be coated on the surface of the antireflection layer 18 as the outermost layer to such an extent not to impair the antireflection performance, or a lubricant may be incorporated in the antireflection layer 18. Such a lubricant may, for example, be a perfluoropolyether, such as KRYTOX, tradename, manufactured by Du Pont, DAIFLOIL, tradename, manufactured by Daikin Industries, Ltd., FOMBLIN, tradename, manufactured by Ausimont Inc., or FLON LUBE, tradename, manufactured by Asahi Glass Company, Limited.

In a case where a scattering-preventive and reflection-preventive resin film like the above-mentioned ARCTOP (tradename) as the antireflection layer 18, a near infrared absorbing agent may be incorporated in such a polyurethane resin layer to impart a near infrared shielding effect to the antireflection layer 18. Further, a pigment and/or dye which absorbs visible light having a specific wavelength, may be incorporated to impart a color-adjusting ability to adjust the color balance of the display color.

Adhesive Layer

A transparent adhesive layer 15 may be interposed for bonding between the above-described second layer 14 and the electromagnetic shielding layer 16, between the electromagnetic shielding layer 16 and the near infrared absorbing layer 17, and between the near infrared absorbing layer 17 and the antireflection layer 18. As a suitable adhesive, a hot melt type adhesive such as an ethylene vinyl acetate copolymer (EVA), or an ultraviolet curing type or thermosetting type adhesive of epoxy or acrylate type may be mentioned. The thickness of the adhesive layer 15 is usually from 0.1 to 1.0 mm, preferably from 0.2 to 0.5 mm.

The impact-resistant film 50 of this embodiment has such a construction that the soft first layer 13 is interposed between the front glass 12 and the second layer 14 made of a hard resin in such a state that the first layer 13 is bonded to the front glass 12 of the flat display panel main body 11, whereby the same effect as the impact-resistant film 10 of the previous embodiment can be obtained such that the impact exerted from the second layer 14 to the front glass 12 side via the first layer 13 will be dispersed, absorbed and reduced by the first layer 13, whereby transmission of the impact force to the front glass 12 can be prevented, and it is possible to provide an impact-resistant film which is light in weight, thin and excellent in the impact resistance. Further, on the viewer's side surface of the second layer 14, the electromagnetic wave-shielding layer 16, the near infrared absorbing layer 17 having a near infrared absorbing function and a color-adjusting function, and the antireflection layer 18, are laminated, whereby it can be applied particularly suitably to a display panel where noises by electromagnetic waves or near infrared rays will be formed, and it is desired to adjust the color balance of the display color, like PDP, as the flat display panel main body 11.

Third Aspect of the Present Invention

In the third aspect, the present invention provides a flat display panel having the impact-resistant film according to the above-described first or second aspect of the present invention bonded on the front glass of the flat display panel main body directly or via a transparent adhesive layer. Now, a flat display panel having the impact-resistant film according to the first aspect of the present invention bonded, will be described in detail.

Flat Display Panel

The flat display panel 20 according to the third aspect of the present invention is constituted by bonding the above-described impact-resistant film 10 on the front glass 12 of the flat display panel main body 11, as shown in FIG. 2. The impact-resistant film 10 may be laminated directly on the front glass 12 of the flat display panel main body 11, as mentioned above. However, in a case where the adhesion of the first layer 13 is not adequate, a transparent adhesive layer may be provided, whereby it can easily be bonded to the flat display panel main body 11. In a case where an adhesive is to be employed, a commercially available adhesive may be used, and a specific example of a preferred adhesive may, for example, be an adhesive such as an acrylate copolymer, a polyvinyl chloride, an epoxy resin, a polyurethane, a vinyl acetate copolymer, a styrene/acryl copolymer, a polyester, a polyamide, a polyolefin, a styrene/butadiene copolymer rubber, a butyl rubber or a silicone resin. Further, in a case where an adhesive layer is to be laminated, it is preferred from the viewpoint of the operation efficiency to preliminarily bond to its adhesive surface a release film such as PET having a silicone resin or a fluorine resin coated thereon. To this adhesive, additives having various functions may be added, such as an ultraviolet absorber, a color-adjusting colorant, a near infrared absorbing (reflecting) colorant, an electron magnetic wave-shielding agent, etc. As a method of bonding the impact-resistant film 10 to the flat display panel main body 11, a roll laminating method, a vacuum laminating method and an autoclave method may, for example, be employed.

The flat display panel main body 11 may be, in addition to PDP, a flat display panel such as a plasma address liquid crystal (PALC) display panel, a field emission display (FED) panel, a liquid crystal (LC) display panel, an electroluminescence (EL) display panel or a cathode ray tube display device (CRT).

EXAMPLES

Now, the effects of the impact-resistant film of the present invention will be described in detail. Examples 1 to 19 represent Working Examples of the present invention, and Examples 20 to 23 represent Comparative Examples.

Example 1

Preparation of glass substrate: On a high strain glass (PD200, tradename, manufactured by Asahi Glass Company, Limited) having a thickness of 2.8 mm, transparent electrodes, bus electrodes, a transparent dielectric and a protecting film were sequentially laminated to prepare a glass substrate which simulated a front glass of PDP of 950 mm×540 mm. Such respective layers were prepared under the following conditions.

Transparent electrodes: ITO was formed into a film by a sputtering method, and then an electrode pattern was prepared by photolithography.

Bus electrodes: Three layers of Cr—Cu—Cr were formed by a sputtering method, and an electrode pattern was prepared by photolithography.

Transparent dielectric: Paste-like low melting glass was formed into a film by solid printing.

Protecting film: On the surface of the transparent dielectric, an adhesive (sealing) layer was formed by screen printing, and then MgO was formed into a film by a vapor deposition method.

A film of 2.0 mm in thickness made of a silicone resin (θ-5, tradename, manufactured by GELTEC Co., Ltd.) having a shear modulus of $3.0 \times 10^4$ Pa, as the first layer, and a film of 1.0 mm in thickness made of a polycarbonate (LEXAN8010, tradename, manufactured by Asahi Glass Company, Limited), as the second layer, were laminated at room temperature by means of a rubber roll, to obtain an impact-resistant film. The shear modulus calculated from the tensile modulus of the above polycarbonate was $9.0 \times 10^9$ Pa.

This impact-resistant film was placed on the above glass substrate surface so that the surface on the silicone resin layer side would be in contact with the glass substrate, and the polycarbonate layer was pressed at room temperature by means of a rubber roll for lamination to obtain a glass substrate provided with the impact-resistant film (hereinafter referred to as an impact-resistant glass substrate).

Using this impact-resistant glass substrate (Example 1), the impact test and the heat resistance test were carried out under the following conditions. The results are shown in Table 1.

Evaluation Method

Shear modulus G': Directly measured under such conditions that the frequency was 1 Hz and the temperature was 25° C., by means of a dynamic viscoelasticity measuring device ARES, manufactured by Rheometric Scientific Co. However, the shear modulus of the polycarbonate or the like, was obtained by measuring the tensile modulus (E) at a temperature of 25° C. by means of the above apparatus and calculating the shear modulus from the tensile modulus in accordance with the formula E=3G'. Unless otherwise specified, the shear modulus was directly measured by the above method.

Impact test: Using a spring impact hammer (Model F-22, manufactured by PTL Co. in Germany) disclosed in IEC standards (Publication 65. 1985), evaluation was carried out by impact forces of 0.2J, 0.35J, 0.50J, 0.70J and 1.00J. Symbol ○ indicates a case where the test sample was not broken, and symbol X indicates a case where the test sample was broken. The impact energy when a polyamide-processed weight (radius: 10 mm, 250 g) stipulated in Electrical Appliance and Material Control Law, is dropped from a height of about 20.4 cm, corresponds to 0.50J. Accordingly, if in this impact test, the test sample has an impact resistance of at least 0.50J, it can be judged that the sample has a practically sufficient impact resistance.

The impact test was carried out by placing the impact-resistant glass substrate on an aluminum plate (10 mm in thickness×1,000 mm in length×600 mm in width), securing the four sides by a vise, and propping the assembly against a concrete wall.

Heat resistant test: The test sample was put into an oven of 80° C., and upon expiration of 1,000 hours, it was taken out, and the appearance was inspected. Symbol ○ indicates a case where there was no change as compared with before it was put into the oven, and symbol X indicates a case where the impact-resistant film was peeled from the glass substrate, or formation of air bubbles between the film and the glass substrate, or a distortion of the surface condition was observed.

Example 2

An impact-resistant glass substrate was prepared in the same manner as in Example 1 except that the thickness of the film (first layer) made of the silicone resin in Example 1 was changed to 3.0 mm, and the same tests as in Example 1 were carried out. The results are shown in Table 1.

Example 3

An impact-resistant glass substrate was prepared in the same manner as in Example 1 except that the film (first layer) made of the silicone resin in Example 1 was changed to a film of 2.0 mm in thickness made of a silicone resin (θ-6, tradename, manufactured by GELTEC Co., Ltd.) having a shear modulus of $1.3 \times 10^5$ Pa, and the same tests as in Example 1 were carried out. The results are shown in Table 1.

Example 4

An impact-resistant glass substrate was prepared in the same manner as in Example 1 except that the film (first layer) made of the silicone resin in Example 1 was changed to a film of 1.0 mm in thickness made of a silicone resin (AGEL, tradename, manufactured by GELTEC Co., Ltd.) having a shear modulus of $4.6 \times 10^3$ Pa, and the same tests as in Example 1 were carried out. The results are shown in Table 1.

Example 5

An impact-resistant glass substrate was prepared in the same manner as in Example 1 except that the thickness of the film made of the silicone resin in Example 4 was changed to 3.0 mm, and the same tests as in Example 1 were carried out. The results are shown in Table 1.

Example 6

An impact-resistant glass substrate was prepared in the same manner as in Example 1 except that the silicone resin in Example 1 was changed to a silicone resin (θ-7, tradename, manufactured by GELTEC Co., Ltd.) having a shear modulus (25° C., 1 Hz) of $7.8 \times 10^3$ Pa, and the same tests as in Example 1 were carried out. The results are shown in Table 1.

Example 7

100 Parts by mass of a silicone resin solution (SD4560, tradename, manufactured by Dow Corning Toray Silicone Co., Ltd.) and 0.9 part by mass of a curing agent for silicone resin (SRX212, tradename, manufactured by Dow Corning Toray Silicone Co., Ltd.) were mixed to obtain a silicone adhesive.

This silicone adhesive was coated on both sides of a film made of the silicone resin used in Example 1 and subjected to drying and annealing treatment at 100° C. for 10 minutes to obtain a silicone resin film having a silicone adhesive of 0.015 mm laminated on each side.

An impact-resistant glass substrate was prepared in the same manner as in Example 1 except that the film (first layer) made of the silicone resin in Example 1 was changed to the silicone resin film, and the same tests as in Example 1 were carried out. The results are shown in Table 1.

Example 8

An impact-resistant glass substrate was prepared in the same manner as in Example 7 except that the film made of the silicone resin in Example 7 was changed to a film of 2.0 mm in thickness made of a silicone resin (AS100, tradename, manufactured by GELTEC Co., Ltd.) having a shear modulus of $4.0 \times 10^5$ Pa, and the same tests as in Example 1 were carried out. The results are shown in Table 1.

Example 9

An impact-resistant glass substrate was prepared in the same manner as in Example 7 except that the film made of the silicone resin in Example 7 was changed to a film of 2.0 mm in thickness made of a silicone resin (θ-8, tradename, manufactured by GELTEC Co., Ltd.) having a shear modulus of $4.1 \times 10^5$ Pa, and the same tests as in Example 1 were carried out. The results are shown in Table 1.

Example 10

An impact-resistant glass substrate was prepared in the same manner as in Example 7 except that the film made of the silicone resin in Example 7 was changed to a film of 1.0 mm in thickness made of a silicone resin (αGEL, tradename, manufactured by GELTEC Co., Ltd.) having a shear modulus of $4.0 \times 10^3$ Pa, and the same tests as in Example 1 were carried out. The results are shown in Table 1.

Example 11

A film of 2.0 mm in thickness made of a silicone resin (αGEL, tradename, manufactured by GELTEC Co., Ltd.) having a shear modulus of $4.6 \times 10^3$ Pa, as the first layer, and a film of 1.0 mm in thickness made of a polycarbonate (LEXAN 8010, tradename, manufactured by Asahi Glass Company, Limited), as the second layer, were laminated at room temperature by means of a rubber roll, and further, a film (ARCTOP UR2199NF, tradename, manufactured by Asahi Glass Company, Limited) having an anti-reflection layer and an adhesive layer laminated on a polyurethane film having a thickness of 0.2 mm, was laminated as the third layer on the polycarbonate side by a rubber roll to obtain an impact-resistant film. Here, the shear moduli calculated from the tensile moduli of the above polycarbonate and polyurethane were $9.0 \times 10^9$ Pa and $6.7 \times 10^6$ Pa, respectively.

This impact-resistant film and the above glass substrate were laminated at room temperature by means of a rubber roll, so that the silicone resin side of the impact-resistant film would be in contact with the glass substrate, to obtain a glass substrate provided with the impact-resistant film (hereinafter referred to as the impact-resistant glass substrate), and the same tests as in Example 1 were carried out. The results are shown in Table 1.

Example 12

The silicone adhesive prepared in Example 4 was coated on each side of the film made of the silicone resin used in Example 11, by means of a bar coater, and subjected to drying and annealing treatment at 100° C. for 10 minutes, to obtain a silicone resin film having a silicone adhesive of 0.015 mm laminated on each side.

An impact-resistant glass substrate was prepared in the same manner as in Example 1 except that the film (first layer) made of the silicone resin of Example 1 was changed to said silicone resin film, and the same tests as in Example 1 were carried out. The results are shown in Table 1.

Example 13

An impact-resistant glass substrate was prepared in the same manner as in Example 12 except that the film made of the silicone resin in Example 12 was changed to a film of 2.0 mm in thickness made of a silicone resin (θ-8, tradename, manufactured by GELTEC Co., Ltd.) having a shear modulus of $4.1 \times 10^5$ Pa, and the same tests as in Example 1 were carried out. The results are shown in Table 1.

Example 14

The silicone resin film (first layer) used in Example 11, a film (second layer) of 0.1 mm in thickness made of a polyethylene terephthalate (A4300, tradename, manufactured by Toyobo Co., Ltd.), and, as the third layer, a film (ARCTOP UR2150, tradename, manufactured by Asahi Glass Company, Limited) having the polyurethane film and the anti-reflection layer as used in Example 1, laminated, were sequentially overlaid and laminated at room temperature by means of a rubber roll to obtain an impact-resistant film, and further, an impact-resistant glass substrate was prepared in the same manner as in Example 1, and the same tests as in Example 1 were carried out.

Example 15

100 Parts by mass of a silicone resin solution (SE1885A, tradename, manufactured by Dow Corning Toray Silicone Co., Ltd.) and 100 parts by mass of a curing agent for silicone resin (SE1885B, tradename, manufactured by Dow Corning Toray Silicone Co., Ltd.) were mixed and coated on the surface of a film of 1.0 mm in thickness made of a polycarbonate (LEXAN 8010, tradename, manufactured by Asahi Glass Company, Limited) by means of a bar coater, so that the thickness would be 1.0 mm, followed by annealing treatment at 100° C. for 30 minutes. In this manner, a film made of the silicone resin was formed on the polycarbonate to obtain an impact-resistant film comprising the silicone resin and the polycarbonate. The shear moduli of the silicone resin and the polycarbonate were $4.0 \times 10^4$ Pa and $9.0 \times 10^9$ Pa, respectively. Here, the shear modulus of the polycarbonate was calculated from the tensile modulus.

Using this impact-resistant film, an impact-resistant glass substrate was prepared in the same manner as in Example 1, and the same tests as in Example 1 were carried out. The results are shown in Table 1.

Example 16

An impact-resistant glass substrate was prepared in the same manner as in Example 15 except that the thickness of the film made of the silicone resin in Example 15 was changed to 3.0 mm, and the same tests as in Example 1 were carried out. The results are shown in Table 1.

Example 17

100 Parts by mass of a silicone resin solution (SD4560, tradename, manufactured by Dow Corning Toray Silicone Co., Ltd.) and 0.9 part by mass of a curing agent for silicone resin (SRX212, tradename, manufactured by Dow Corning Toray Silicone Co., Ltd.) were mixed to obtain a silicone adhesive.

The film made of the silicone resin formed in Example 15 was peeled from the polycarbonate, and the above silicone adhesive was coated on each side of this film made of the silicone resin by means of a bar coater. Drying and anneal treatment were carried out at 100° C. for 10 minutes to obtain a silicone resin film having the silicone adhesive of 0.015 mm laminated on each side.

The glass substrate prepared in Example 15, the silicone resin film having the silicone adhesive laminated and the above polycarbonate were overlaid sequentially and laminated at room temperature by means of a rubber roll to obtain a glass substrate provided with an impact-resistant film comprising the polycarbonate and the silicone resin film. Using this glass substrate, the same tests as in Example 1 were carried out. The results are shown in Table 1.

Example 18

65 Parts by mass of PREMINOL PML-3012 (tradename for a polyether type polyol manufactured by Asahi Glass Company, Limited), 28 parts by mass of EXCENOL EL-1030 (tradename for a polyether type polyol manufactured by Asahi Glass Company, Limited), 100 parts by mass of PREMINOL PML-1003 (tradename for a polyether type polyol manufactured by Asahi Glass Company, Limited), 30 parts by mass of hexamethylene diisocyanate, 0.2 part by mass of dibutyltin dilaurate and 2 parts by mass of an antioxidant (IRGANOX 1010, tradename, manufactured by Ciba Geigy) were mixed, defoamed and then cast on a polyethylene terephthalate film having release treatment applied and reacted at 80° C. for 20 minutes, to obtain a polyurethane film having a thickness of 2.0 mm. The shear modulus of this polyurethane film was $3.1 \times 10^5$ Pa.

On each side of this polyurethane film, an acryl type adhesive (a mixture of 150 parts by mass of SK dyne 1604N, tradename, manufactured by Soken Chemical & Engineering Co., Ltd. and 2 parts by mass of L-45, tradename, manufactured by Soken Chemical & Engineering Co., Ltd.) was coated by means of a bar coater, dried at 100° C. for 10 minutes and subjected to anneal treatment to obtain a polyurethane film having the acryl type adhesive laminated in a thickness of 0.015 mm on each side.

An impact-resistant glass substrate was prepared in the same manner as in Example 1 except that the film made of the silicone resin in Example 1 was changed to the polyurethane film, and the same tests as in Example 1 were carried out. The results are shown in Table 1.

Example 19

An impact-resistant glass substrate was prepared in the same manner as in Example 11 except that the film made of the silicone resin in Example 11 was changed to the polyurethane film having the acrylic adhesive laminated, as prepared in Example 18, and the same tests as in Example 1 were carried out. The results are shown in Table 1.

Example 20

The impact test was carried out using only the glass substrate having no impact-resistant film bonded. The results are shown in Table 1.

Example 21

On one side of a film made of a polycarbonate (LEXAN 8010, tradename, manufactured by Asahi Glass Company, Limited, shear modulus: $9.0 \times 10^9$ Pa) and having a thickness of 2.0 mm, an acryl type adhesive (a mixture of 150 parts by weight of SK dyne 1604N, tradename, manufactured by Soken Chemical & Engineering Co., Ltd. and 2 parts by mass of L-45, tradename, manufactured by Soken Chemical & Engineering Co., Ltd.) was laid in a thickness of 0.015 mm and laminated at room temperature by means of a rubber roll, so that the adhesive side was in contact with the glass substrate, to prepare a glass substrate provided with an impact-absorbing film, and the same tests as in Example 1 were carried out. The results are shown in Table 1.

Example 22

A film of 0.5 mm in thickness made of a silicone resin (θ-5, tradename, manufactured by GELTEC Co., Ltd., shear modulus: $3.0 \times 10^4$ Pa) and a film of 0.5 mm in thickness made of a polycarbonate (LEXAN 8010, tradename, manufactured by Asahi Glass Company, Limited, shear modulus: $9.0 \times 10^9$ Pa), were bonded at room temperature by means of a rubber roll and laminated at room temperature by means of a rubber roll so that the silicone surface would be in contact with the glass substrate to obtain a glass substrate provided with an impact absorption film, and the same tests as in Example 1 were carried out. The results are show in Table 1.

Example 23

On each side of a polypropylene/EVA/polypropylene film (POVIC-T, tradename, manufactured by Achilles Corporation) having a thickness of 0.8 mm, an acryl type adhesive (a mixture of 150 parts by mass of SK dyne 1604N, tradename, manufactured by Soken Chemical & Engineering Co., Ltd. and 2 parts by mass of L-45, tradename, manufactured by Soken Chemical & Engineering Co., Ltd.) was laminated, and on one side thereof, a film made of a polyethylene terephthalate (COSMOSHINE A4300, tradename, manufactured by Toyobo Co., Ltd.) and having a thickness of 0.188 mm, was laminated at room temperature by means of a rubber roll.

The shear modulus of the polypropylene/EVA/polypropylene film and the polyethylene terephthalate film, as calculated from the tensile modulus, was $6.9 \times 10^7$ Pa, and $2.0 \times 10^9$ Pa, respectively. This impact-absorbing film and the above glass substrate were laminated at room temperature by means of a rubber roll so that the adhesive side of the impact-absorbing film would be in contact with the glass substrate, to prepare a glass substrate provided with the impact-absorbing film, and the same tests as in Example 1 were carried out. The results are shown in Table 1.

TABLE 1

| | Impact force (unit: J) | | | | | Heat resistance |
|---|---|---|---|---|---|---|
| | 0.20 | 0.35 | 0.50 | 0.70 | 1.00 | |
| Ex. 1 | ○ | ○ | ○ | ○ | X | ○ |
| Ex. 2 | ○ | ○ | ○ | ○ | ○ | ○ |
| Ex. 3 | ○ | ○ | ○ | ○ | X | ○ |
| Ex. 4 | ○ | ○ | ○ | X | X | ○ |
| Ex. 5 | ○ | ○ | ○ | ○ | ○ | ○ |
| Ex. 6 | ○ | ○ | ○ | ○ | X | ○ |
| Ex. 7 | ○ | ○ | ○ | ○ | X | ○ |
| Ex. 8 | ○ | ○ | ○ | ○ | X | ○ |
| Ex. 9 | ○ | ○ | ○ | ○ | X | ○ |
| Ex. 10 | ○ | ○ | ○ | X | X | ○ |
| Ex. 11 | ○ | ○ | ○ | ○ | ○ | ○ |
| Ex. 12 | ○ | ○ | ○ | ○ | ○ | ○ |
| Ex. 13 | ○ | ○ | ○ | ○ | ○ | ○ |
| Ex. 14 | ○ | ○ | ○ | ○ | ○ | ○ |
| Ex. 15 | ○ | ○ | ○ | ○ | X | ○ |
| Ex. 16 | ○ | ○ | ○ | ○ | ○ | ○ |
| Ex. 17 | ○ | ○ | ○ | ○ | ○ | ○ |
| Ex. 18 | ○ | ○ | ○ | ○ | X | ○ |
| Ex. 19 | ○ | ○ | ○ | ○ | ○ | ○ |
| Ex. 20 | X | X | X | X | X | — |
| Ex. 21 | X | X | X | X | X | ○ |
| Ex. 22 | X | X | X | X | X | ○ |
| Ex. 23 | X | X | X | X | X | X |

As is evident from the results shown in Table 1, each of the impact-resistant films of Examples 1 to 19 of the present invention, had sufficient impact-resistance in such a state that it was bonded to a glass substrate prepared to simulate a front glass of PDP, to form an impact-resistant glass substrate.

On the other hand, the glass substrate of Example 20 having no impact-resistant film bonded, had an impact resistance lower than 0.2J.

Further, the impact-resistant glass substrate of Example 21 having a polycarbonate layer having a thickness of 2.0 mm bonded to this glass substrate via a thin adhesive layer, had a impact resistance lower than 0.2J. From this, it is apparent that the impact resistance can not be increased merely by bonding a hard resin film to the glass substrate.

Further, the impact-resistant glass substrate of Example 22 in which the thickness of the first layer was 0.5 mm, had an impact resistance lower than 0.2J.

Further, the impact-resistant glass substrate of Example 23 having a laminate prepared to simulate a conventional laminate, bonded, had an impact resistance lower than 0.2J, and the impact resistance was evidently inferior to each of the impact-resistant glass substrates of Examples 1 to 19 of the present invention.

INDUSTRIAL APPLICABILITY

According to the present invention, it is possible to provide a flat display panel and an impact-resistant film for a flat display panel, which is bonded to a front glass of a flat display panel to prevent breakage of the glass by an impact and whereby weight reduction and thickness reduction are made possible.

The entire disclosures of Japanese Patent Application No. 2002-48154 filed on Feb. 25, 2002, Japanese Patent Application No. 2002-48156 filed on Feb. 25, 2002 and Japanese Patent Application No. 2002-48157 filed on Feb. 25, 2002 including specifications, claims, drawings and summaries are incorporated herein by reference in their entireties.

What is claimed is:

1. An impact-resistant film for a flat display panel, which is bondable to a front glass of a flat display panel main body, said film comprising:
    a first layer on the front glass side of the flat display panel main body, said first layer made of a transparent synthetic resin having a shear modulus of from $1 \times 10^3$ Pa to $1 \times 10^6$ Pa and having a thickness within a range of from 1 to 4 mm, and
    a second layer on a viewer's side of the first layer said second layer made of a transparent synthetic resin having a sheer modulus of at least $1 \times 10^8$ Pa and having a thickness within a range of from 0.05 to 3 mm.

2. The impact-resistant film for a flat display panel according to claim 1, wherein the second layer is laminated on the viewer's side surface of the first layer.

3. The impact-resistant film for a flat display panel according to claim 1, wherein the first layer is made of a resin material having an adhesive property, to be directly bonded on the front glass of the flat display panel.

4. The impact-resistant film for a flat display panel according to claim 1, wherein at least one layer selected from the group consisting of an electromagnetic wave shielding layer, a near infrared absorption layer and an antireflection layer, and an adhesive layer bonding such layers, are laminated on the viewer's side of the second layer.

5. A flat display panel having the impact-resistant film for a flat display panel as defined in claim 1 bonded on its front glass directly or via a transparent adhesive layer.

6. The impact-resistant film for a flat display panel according to claim 1, wherein the first layer is made of a film.

7. The impact-resistant film for a flat display panel according to claim 1, wherein the total thickness of the first layer and the second layer is from 3 to 7 mm.

8. An impact-resistant film for a flat display panel, which is bondable to a front glass of a flat display panel main body, said film comprising:
    a first layer on the front glass side of the flat display panel main body, said first layer made of a transparent synthetic resin having a shear modulus of from $1 \times 10^3$ Pa to $1 \times 10^6$ Pa and having a thickness within a range of from 1 to 4 mm,
    a second layer on the viewer's side of the first layer, said second layer made of a transparent synthetic resin having a shear modulus of at least $1 \times 10^8$ Pa, and
    a third layer on the viewer's side of the second layer, said third layer made of a transparent synthetic resin having a shear modulus of at least $1 \times 10^6$ Pa and less than $1 \times 10^8$ Pa.

9. The impact-resistant film for a flat display panel according to claim 8, wherein the thickness of the second layer is within a range of from 0.05 to 3 mm and the thickness of the third layer is within a range of from 0.05 to 2 mm.

10. The impact-resistant film for a flat display panel according to claim 8, wherein the first layer, the second layer and the third layer are laminated sequentially.

11. The impact-resistant film for a flat display panel according to claim 8, wherein the first layer is made of a resin material having an adhesive property, to be directly bonded on the front glass of the flat display panel.

12. The impact-resistant film for a flat display panel according to claim 8, wherein at least one layer selected from the group consisting of an infrared absorption layer, an electromagnetic wave shielding layer and an antireflection layer, and an adhesive layer bonding such layers, are laminated on the viewer's side of the third layer.

13. A flat display panel having the impact-resistant film for a flat display panel as defined in claim 8 bonded on its front glass directly or via a transparent adhesive layer.

* * * * *